July 14, 1925.
R. HOLMAN
1,545,901
SUNDAE DISH FORMING MACHINE
Filed April 30, 1923 9 Sheets-Sheet 1
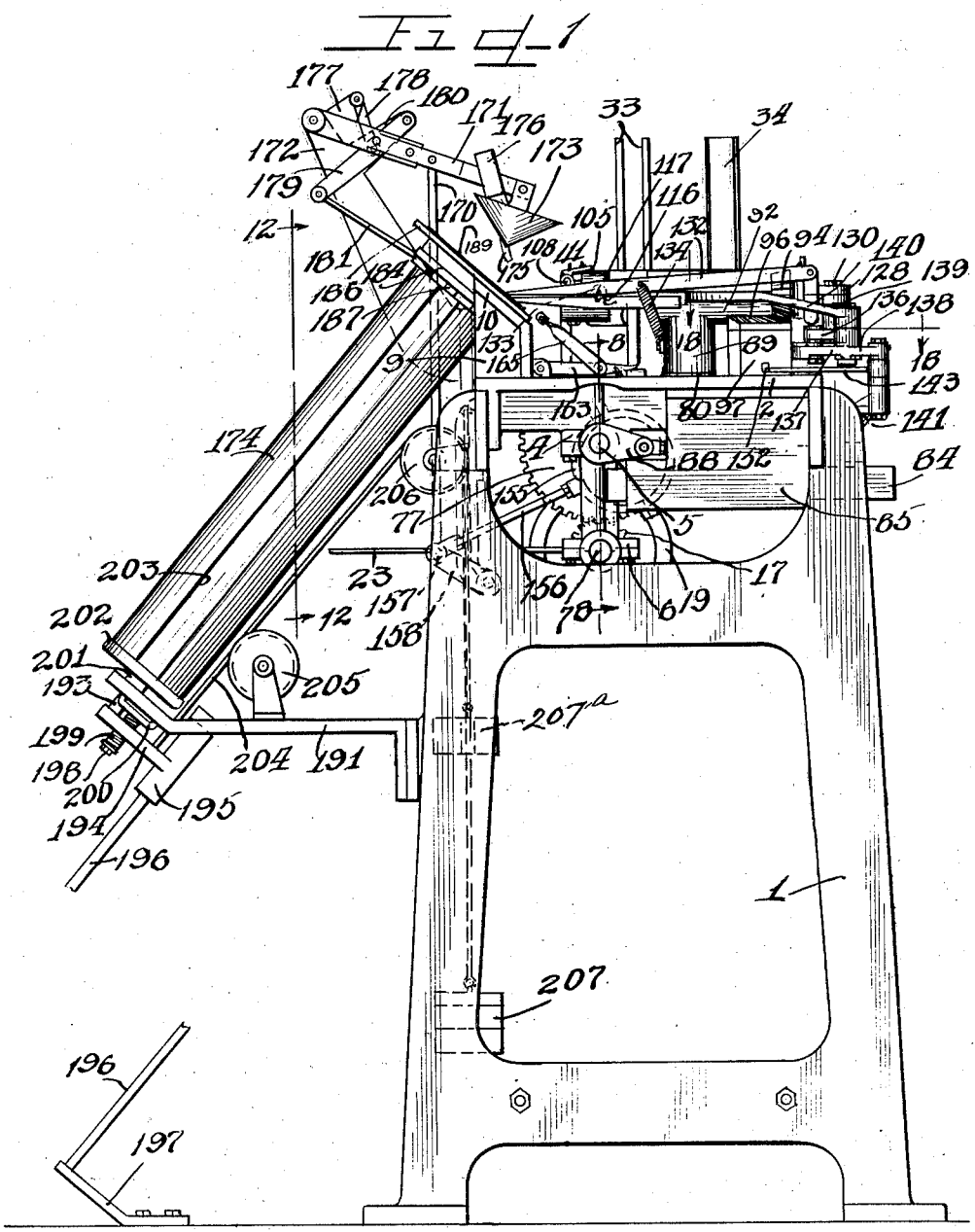

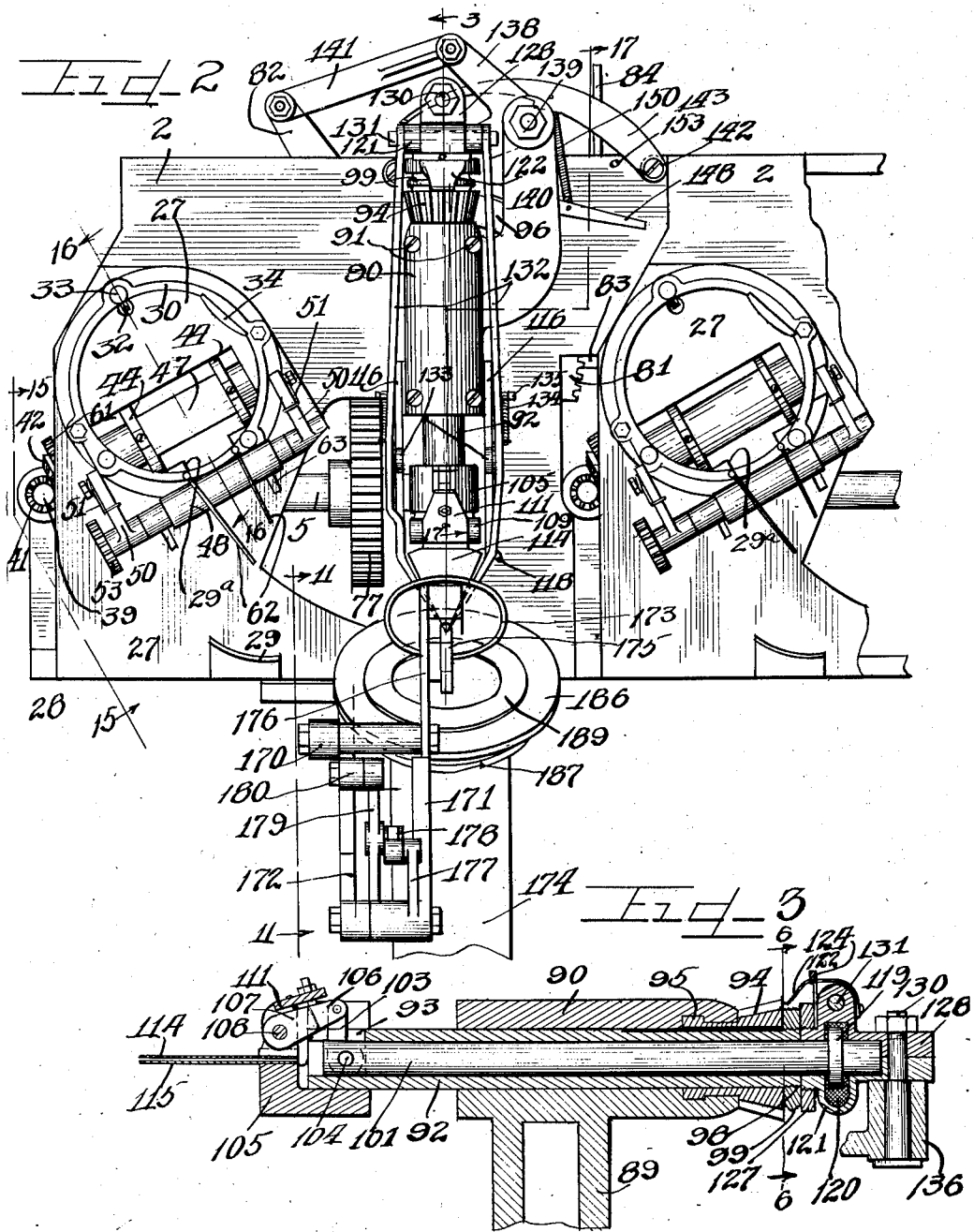

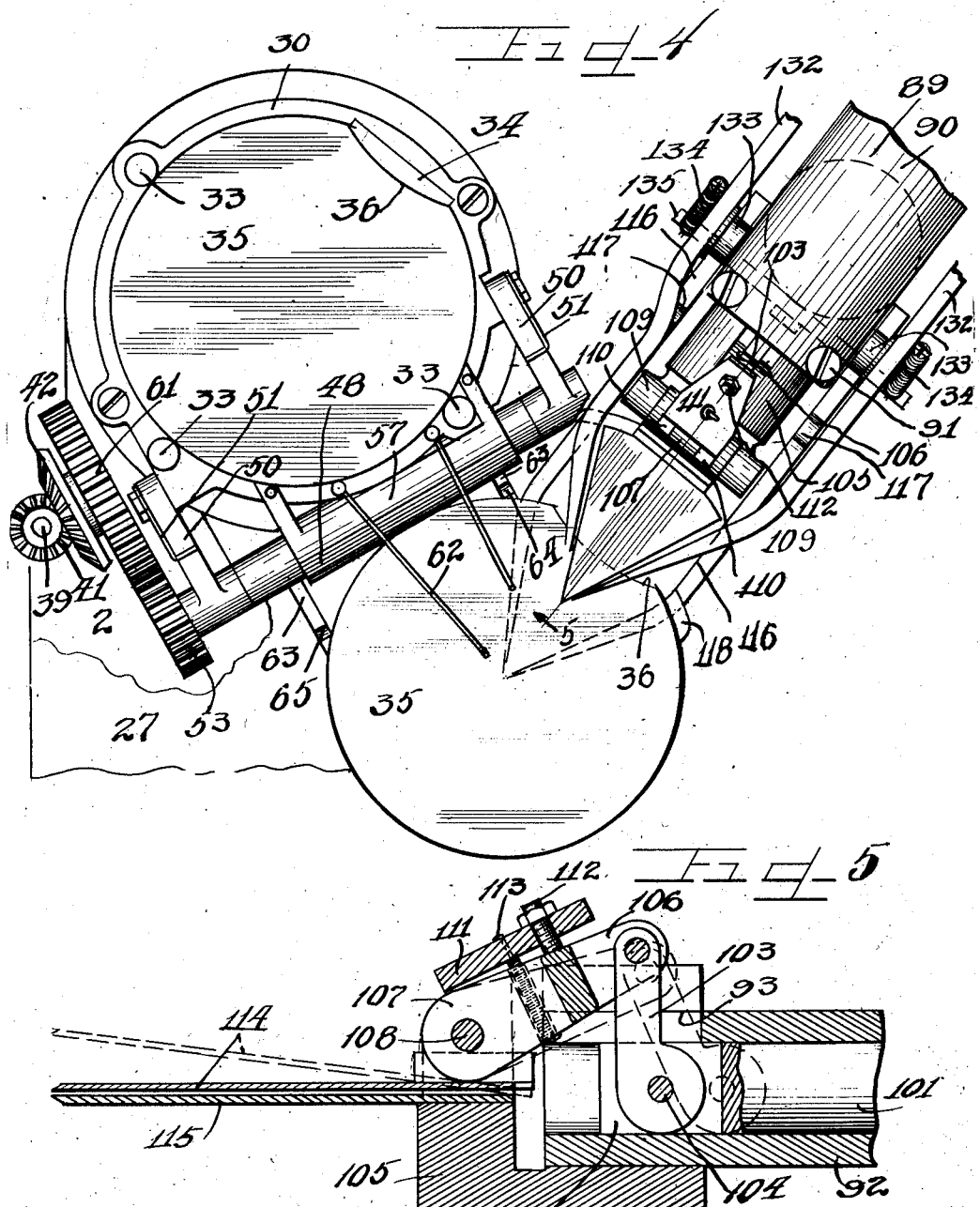

July 14, 1925. 1,545,901
R. HOLMAN
SUNDAE DISH FORMING MACHINE
Filed April 30, 1923 9 Sheets-Sheet 4
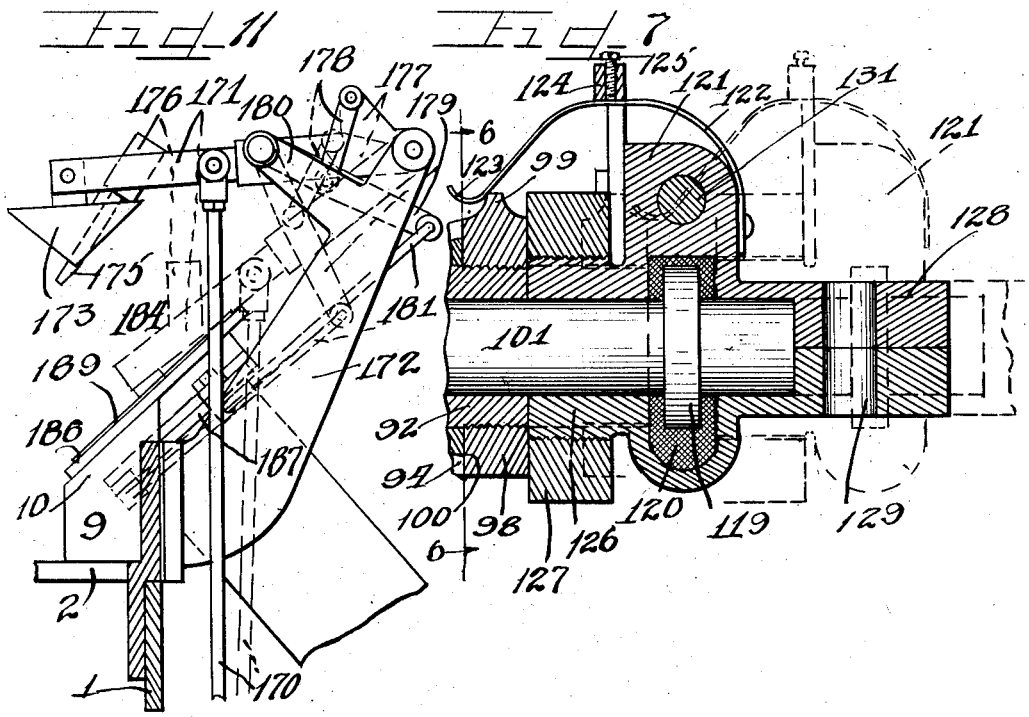
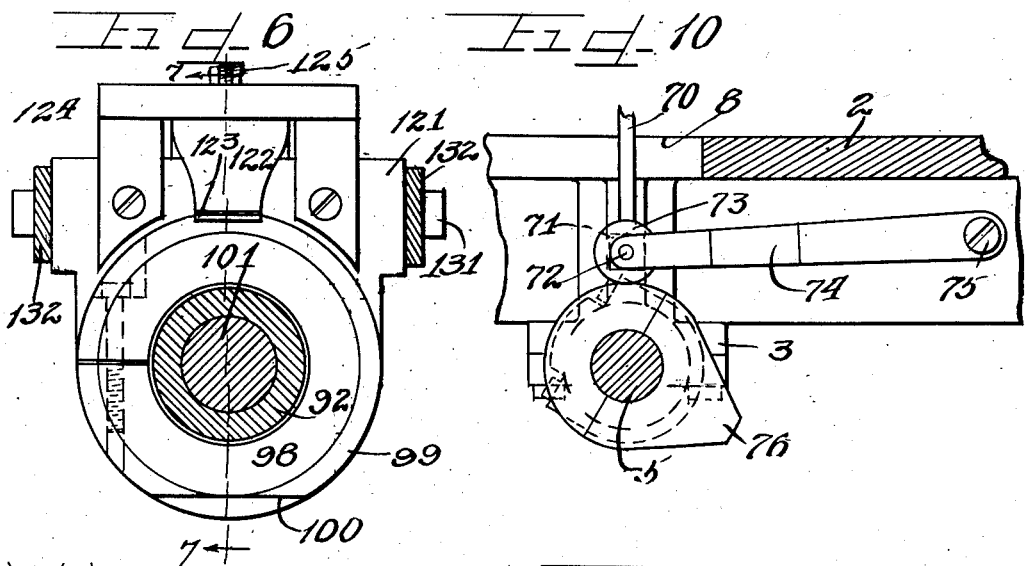

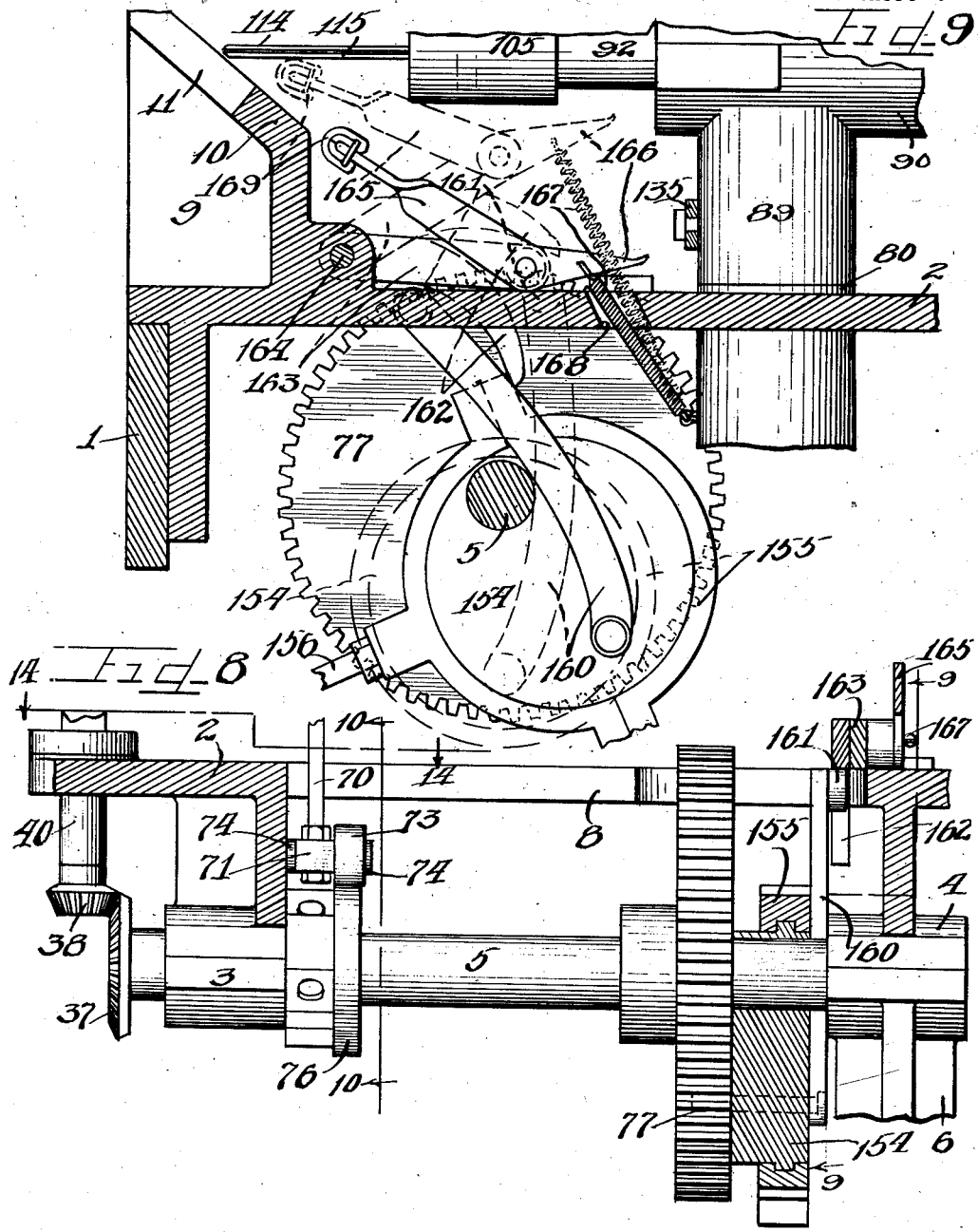

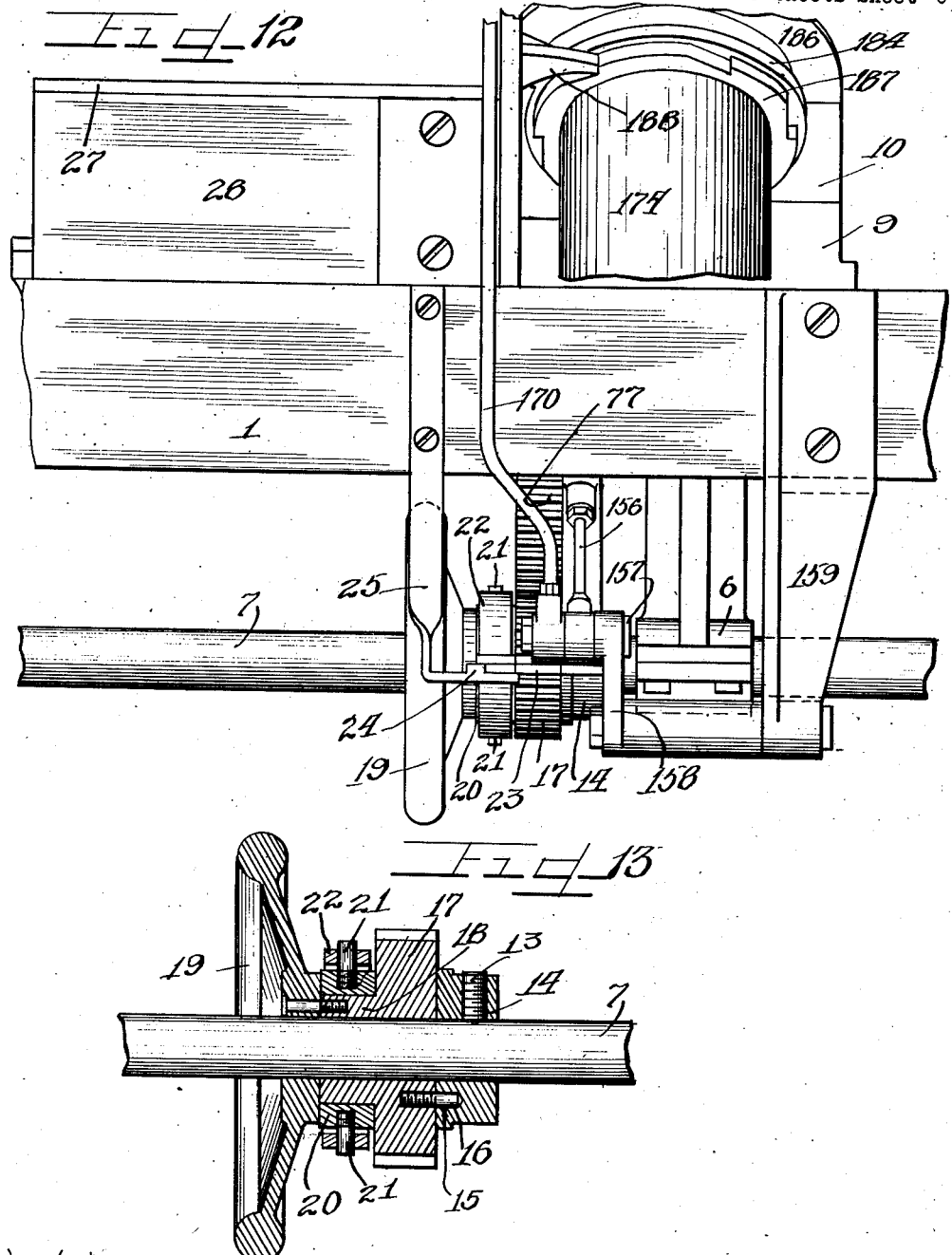

July 14, 1925.
R. HOLMAN
SUNDAE DISH FORMING MACHINE
Filed April 30, 1923    9 Sheets-Sheet 7
1,545,901
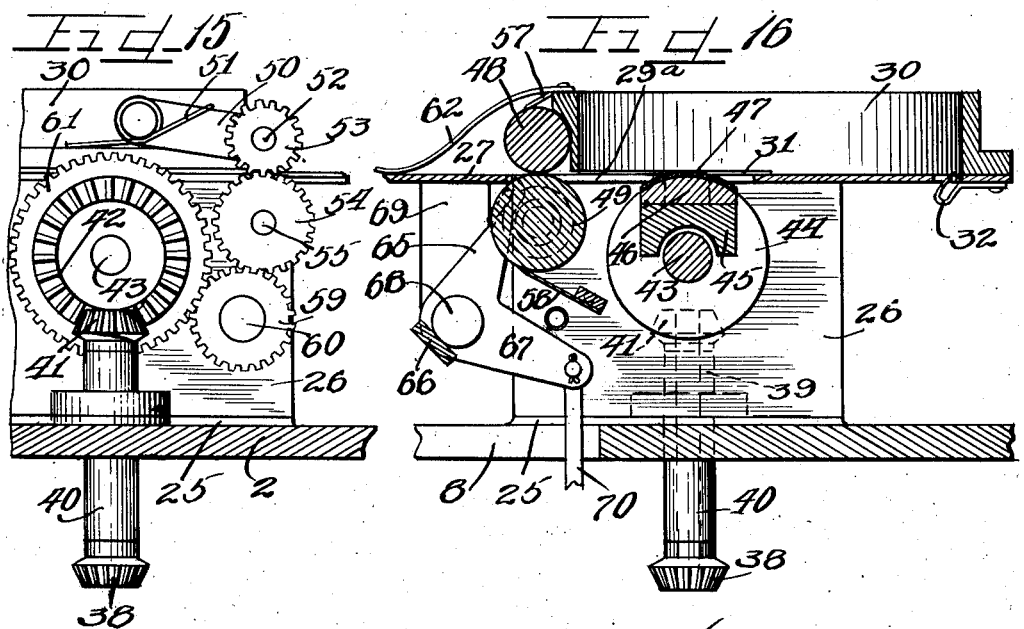
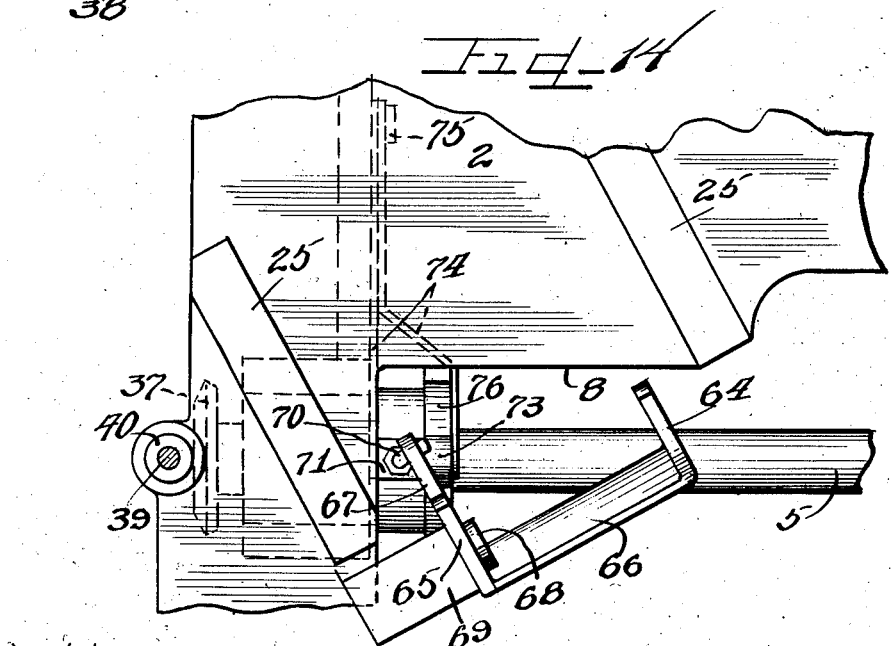

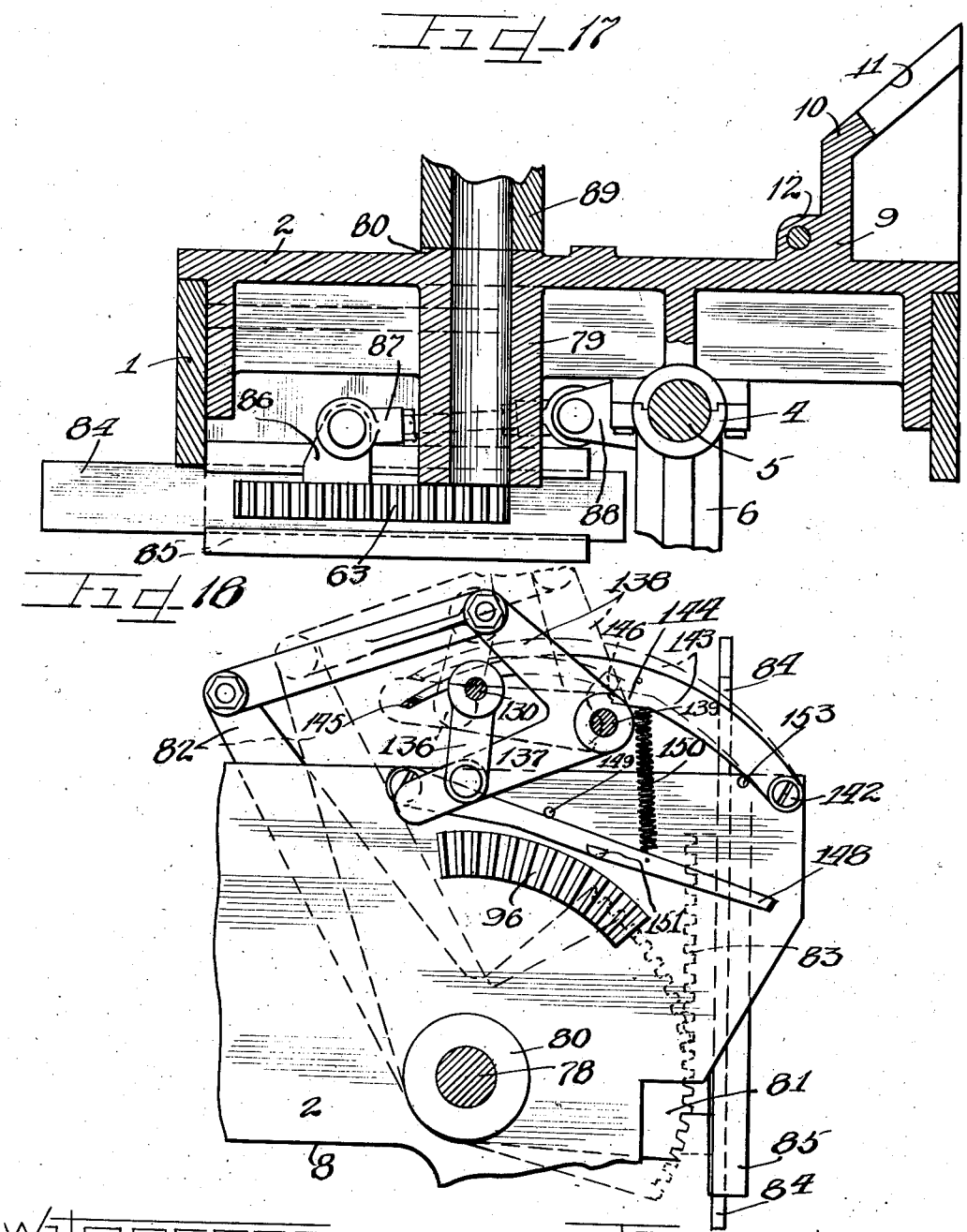

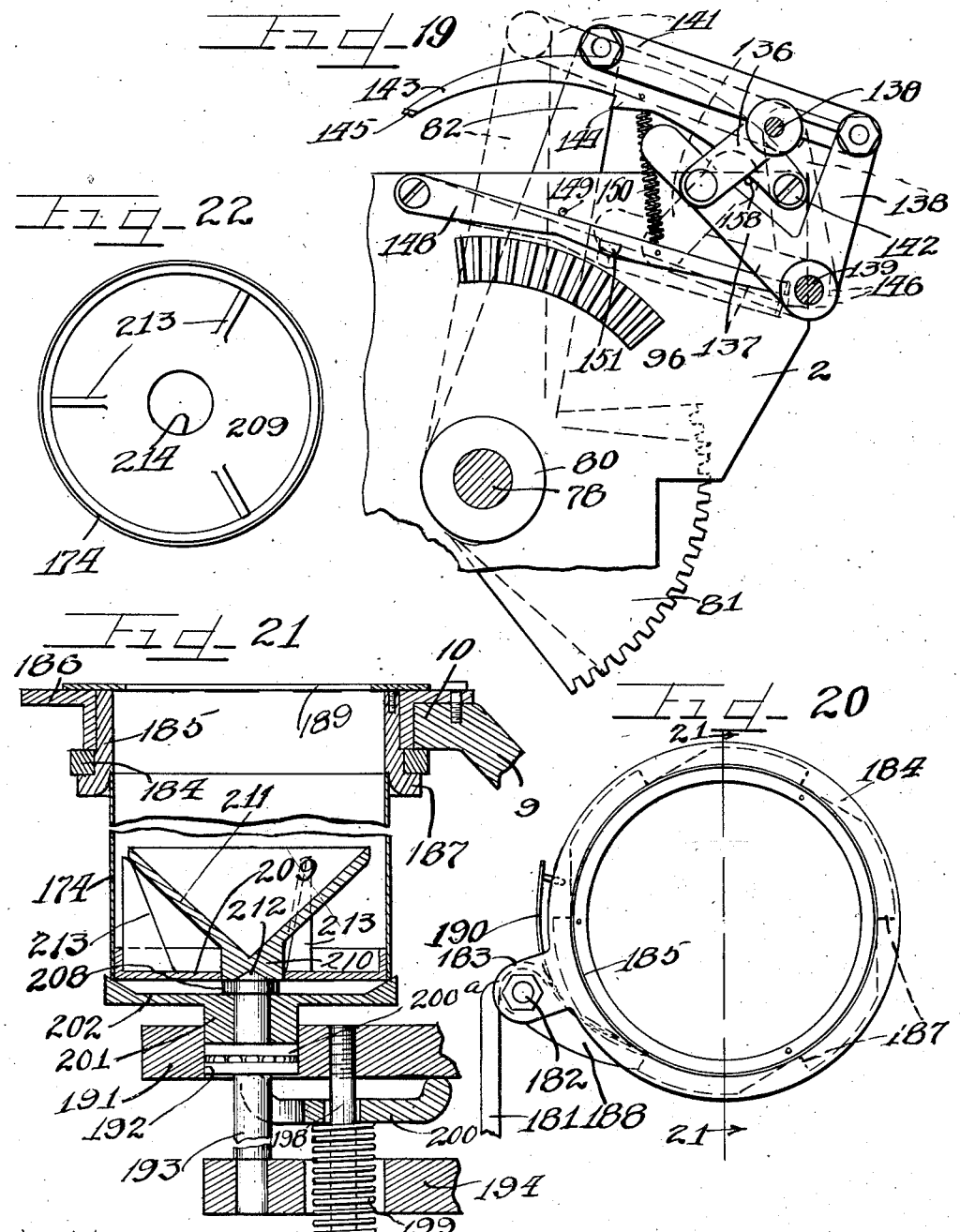

Patented July 14, 1925.

1,545,901

UNITED STATES PATENT OFFICE.

RUDOLPH HOLMAN, OF CHICAGO, ILLINOIS, ASSIGNOR TO THE VORTEX MFG. CO., OF CHICAGO, ILLINOIS, A CORPORATION OF ILLINOIS.

SUNDAE-DISH-FORMING MACHINE.

Application filed April 30, 1923. Serial No. 635,448.

*To all whom it may concern:*

Be it known that I, RUDOLPH HOLMAN, a citizen of the United States, and a resident of the city of Chicago, in the county of Cook and State of Illinois, have invented certain new and useful Improvements in a Sundae-Dish-Forming Machine; and I do hereby declare that the following is a full, clear, and exact description of the same, reference being had to the accompanying drawings, and to the numerals of reference marked thereon, which form a part of this specification.

This invention relates to an improved forming machine adapted to automatically feed dish blanks one at a time from a magazine into the field of operation of a forming mechanism which acts to automatically fold a portion of the blank to form the same into a dish as the forming mechanism swings into a position wherein the formed dish is adapted to be automatically removed from the forming mechanisms and delivered into a dish receiving tube having a dish holder therein adapted to be automatically lowered and rotated a predetermined amount each time a dish is delivered thereto.

It is an object of this invention to provide a forming machine adapted to automatically form sundae dishes from circular dish blanks having segments cut from the periphery thereof.

It is also an object of this invention to provide a forming machine wherein a forming mechanism is adapted to automatically grip a portion of a blank and turn the gripped portion into a position whereby the remaining portion of the blank is shaped into a conical sundae dish having three thicknesses at the gripped or folded portion of the dish.

It is another object of the invention to provide a forming machine wherein a pivotally supported forming mechanism is adapted to take blanks delivered from a magazine, form the blanks into sundae dishes and then transfer the sundae dishes into a position to permit the same to be delivered into a receiving tube with the folded portions of said dishes staggered with respect to one another to permit the formation of a straight stack of formed sundae dishes.

It is a further object of the invention to provide a machine to form conical sundae dishes from prepared blanks and then deliver the dishes into a removable rotatable tube containing a receding dish holder.

It is furthermore an object of this invention to provide a dish forming machine having a dish receiving mechanism provided with a rotatable dish receiving tube having a dish holder therein adapted to be lowered a predetermined amount each time a dish is delivered into the tube.

Another object of the invention is the provision of a dish forming machine wherein prepared blanks in a magazine are delivered one at a time to feed rollers which act to advance the cup blanks into a position properly centered to permit engagement thereof by a dish forming mechanism which is mounted to first swing into a blank gripping position and when moving back into normal position adapted to operate to form a sundae dish out of the blank and deliver the formed dish into a position wherein a mechanism is adapted to push the formed dish into a tube which is partially rotated with each dish delivery as a holder in the tube is retracted.

It is also an object of the invention to provide a machine wherein a pivotally mounted dish forming mechanism is adapted to swing back and forth between a dish blank feed mechanism and a dish receiving device having means associated therewith for taking the formed dish from the forming mechanism and delivering the same into a rotatable receiving tube having a receding dish receiving holder therein.

It is an important object of this invention to provide a machine of improved and simplified construction wherein each of a plurality of aligned units is adapted to be driven independently from a common source and each having a swinging dish forming device which is adapted to move into a position to grip a blank delivered from a magazine and form the blank into a sundae dish while the forming device swings back toward a normal position where the formed dish is automatically removed and pushed into a rotatable receiving tube having a receding dish holder therein.

Other and further important objects of this invention will be apparent from the disclosures in the specification and accompanying drawings.

The invention (in a preferred form) is illustrated in the drawings and hereinafter more fully described.

On the drawings:—

Figure 1 is a side elevation of a sundae dish forming machine embodying the principles of this invention.

Figure 2 is a top plan view thereof showing the cup receiving tube partly broken away and also illustrating a fragmentary portion of a second machine disposed adjacent the first and independently operable from a common driving shaft.

Figure 3 is an enlarged fragmentary detail section taken on line 3—3 of Figure 2 with parts in elevation.

Figure 4 is an enlarged top plan view of the cup blank magazine showing a fragmentary portion of the forming mechanism swung into a position ready to engage a cup blank delivered from the magazine.

Figure 5 is an enlarged detail section taken on line 5—5 of Figure 4.

Figure 6 is a sectional view taken on line 6—6 of Figure 3.

Figure 7 is a longitudinal detail section taken on line 7—7 of Figure 6 with parts in elevation.

Figure 8 is an enlarged detail view taken on line 8—8 of Figure 1.

Figure 9 is a sectional detail view taken on line 9—9 of Figure 8.

Figure 10 is a detail section taken on line 10—10 of Figure 8.

Figure 11 is a detail view of the cup discharge mechanism taken on line 11—11 of Figure 2.

Figure 12 is an enlarged fragmentary view taken on line 12—12 of Figure 1 with parts broken away.

Figure 13 is an enlarged vertical section of the hand wheel and clutch mechanism shown in Figure 12.

Figure 14 is a detail plan view taken on line 14—14 of Figure 8.

Figure 15 is a fragmentary detail vertical view of the cup blank feed mechanism taken on line 15—15 of Figure 2.

Figure 16 is an enlarged vertical detail section through the cup blank feed mechanism taken on line 16—16 of Figure 2.

Figure 17 is an enlarged fragmentary section taken on line 17—17 of Figure 2 with parts of the forming mechanism omitted.

Figure 18 is an enlarged fragmentary plan view of the actuating mechanisms for the cup forming device taken on line 18—18 of Figure 1 and showing the operation in dotted lines.

Figure 19 is a similar plan view showing the mechanisms in a position wherein the cup forming mechanism is moved into the position illustrated in Figure 4. The operation is also illustrated by dotted lines.

Figure 20 is a detail top end view of the cup receiving magazine with the cup retaining ring removed.

Figure 21 is a fragmentary longitudinal section of the cup receiving magazine taken on line 21—21 of Figure 20, showing the cup retaining ring in place on the upper end of the magazine.

Figure 22 is a top end view of the dish receiving cylinder or tube with the cup holder removed.

As shown on the drawings:—

The reference numeral 1 indicates a machine framework having a table 2 mounted on the top thereof. Supported or formed on the underside of the table 2 are bearings 3 and 4 in which a driven shaft 5 is journalled. A bearing 6 is supported on the driven shaft bearing 4 and serves as a bearing for a drive or main shaft 7. The table 2 is provided with an opening 8 partly illustrated in Figure 14. Integrally formed on the table 2 along the front margin thereof is a pedestal or support 9 having an inclined top board 10 provided with an opening 11 (Figure 9). A passaged boss 12 is integrally formed on the table 2 at the foot of the pedestal 9.

The machine is operated from the drive shaft 7 which is adapted to be connected with any desired type of power transmission. Secured upon the drive shaft 7 by means of a set screw 13 is a drive collar 14 having a recess or opening 15 in one face thereof (Figure 13) adapted to receive a pin 16. The pin 16 is secured to a gear 17 which is slidably supported on the drive shaft 7 adjacent one side of the collar 14. A hub 18 is integrally formed on one side of the gear 17 and has secured thereto a hand wheel 19 also slidable on the shaft 7. The gear 17 and the hand wheel 19 form a clutch mechanism adapted to be slidably moved on the drive shaft 7 into and out of driving engagement with the drive collar 14. A ring 20 is rotatably mounted on the hub 18 and has two pins 21 secured radially thereon and diametrically opposite one another. The pins 21 project through openings in an outer ring 22 having a handle or lever 23 formed thereon to permit actuation of the clutch mechanism to start or stop the machine. The lever 23 is adapted to engage a stop block 24 formed on a bracket arm 25 fixed on the framework 1 (Figure 12) to hold the clutch mechanism connected with the drive collar 14. To move the clutch mechanism out of engagement with the drive collar, the lever 23 is swung upwardly to clear the stop block 24 and is then moved to engage behind the opposite side of the stop block 24, in which position the drive pin 16 is moved out of the hole in the drive collar 14.

The machine is provided with a dish blank feed mechanism supported upon the table 2. Integrally formed on the top of the table 2 are two parallel bosses 25 (Figure 14) on which are supported upright bracket plates 26 on the top of which a blank feed platform or table 27 is rigidly supported. The blank feed platform 27 has the front margin thereof resting on an upright flange 28 formed on the front margin of the table 2. A curved blank stop 29 is secured upon the top of the blank feed platform 27 as shown in Figure 2. The platform 27 is provided with a T-opening 29a and has mounted thereon a dish blank magazine 30 provided with a blank outlet mouth or slot 31 (Figure 16). Secured to the bottom of the platform 27 and projecting up into the magazine 30 is a pin hook 32. Secured to the magazine and projecting upwardly therefrom are a plurality of blank guide posts 33 which together with a guide bar 34 fastened within the inner periphery of the magazine serve as guides for the stack of prepared dish blanks 35, each of which is of circular form having a segment cut out of the periphery thereof at 36. The guide bar 34 is provided with a convex surface complemental to the notches 36 in the blanks 35.

The blank feed mechanism is operated from the shaft 5. Fixed on one end of said shaft 5 is a beveled gear 37 which meshes with a beveled pinion 38 fixed on the lower end of a vertical stub shaft 39 journalled in a bearing sleeve 40 which projects through the table 2. A beveled gear 41 is secured on the upper end of the stub shaft 39 above the table 2 and is in mesh with a beveled gear 42. The bevel gear 42 is secured on a horizontal shaft 43 which projects through bearings on the upright bracket plates 26. Disks 44 are supported on the shaft 43 between the bracket plates 26. A bar 45 connects the disks 44 and has supported thereon a convex block 46 covered with a dish blank friction pad 47 made of rubber or other suitable material. The blank feed pad 47 extends around only a portion of the periphery of the reel formed by the disks 44 so as to operate on a dish blank in the magazine at a predetermined time to advance a dish blank from the bottom of the stack in the magazine through the outlet slot 31 and between a feed mechanism comprising a pair of blank feed rollers 48 and 49. The upper feed roller 48 has the reduced ends thereof supported in arms 50 pivoted on the magazine 30. The arms 50 are held in a lowered position by means of coiled springs 51. Fixed on one end of the upper roll shaft 52 is a small gear or pinion 53 which meshes with an intermediate gear 54 secured on one reduced end 55 of a lower roller 49. The reduced ends 55 of the lower roller shaft are journalled in openings provided for the purpose in the bracket plates 26. The upper feed roll 48 is provided with a scraping device 57 (Fig. 16) while the lower feed roll has coacting therewith a lower scraping mechanism 58. As illustrated in Figure 15 the lower roller gear 54 is in mesh with a gear 59 supported on a stud 60 on one of the bracket plates 26. The gear 59 is in mesh with a large gear 61 mounted on the shaft 43 to the inside of the bevel gear 42. Attached to the top of the magazine 30 are the upper ends of a pair of springs 62 which are directed downwardly over the upper feed roller 48 and have the free ends thereof curved upwardly and pressing upon the blank feed platform 27 as shown in Figure 16.

The platform 27 is provided with two parallel slots 63 through which the hooked ends or tips of a pair of spaced pusher arms 64 and 65 project. The arms 64 and 65 are connected by a bar 66 (Fig. 14). An arm 67 is integrally formed on one of the arms 65. The arms 65 and 67 form a bell crank which is pivoted at 68 to a bracket 69 secured to the framework 1. The upper end of a rod 70 is pivotally connected to the bell-crank arm 67. The rod 70 projects downwardly through the table opening 8 and has the lower end thereof attached to a block 71 carrying a pin 72. A roller 73 is engaged on the pin 72. Also connected to the pin 72 to the outside of the roller 73 and to the outside of the block 71 are the arms of a forked lever 74 pivoted to the framework 1 at 75. The roller 73 rides on a cam 76 which is fixed on the shaft 5. The shaft 5 has a large gear 77 fixed thereon in a position to mesh with the drive gear 17 to receive a drive therefrom.

When a dish blank 35 is fed from the magazine and advanced by the feed rollers 48 and 49 onto the blank platform 27 below the springs 62, the arms 64 and 65 engage behind the blank and push the same into a centered position against the stop 29 as illustrated in Figure 4. The advanced blank is now in a position to be engaged by the dish forming mechanism.

The disk forming mechanism is supported on a vertical shaft 78 which is journaled in a bearing sleeve 79 integrally formed on the table 2 and extending thereabove to form a boss 80. Rotatable on the lower end of the shaft 78 is a gear segment 81 having an arm 82 integrally formed thereon to form a bell crank member. The gear segment is operated back and forth by means of a rack 83 which is in mesh with the gear segment. The rack 83 is fixed on a slidable bar 84 (Fig. 18) which is slidably supported in a groove of a bracket plate 85 fixed on the bottom of the table 2. Formed on the rack 83 is an upright arm 86, to which one end of a connecting rod 87 is pivotally connected. The other end of the connecting rod 87 is pivotally connected to a crank 88 fixed on the end of the shaft 5 to the outside of the bearing 4.

Rotatable on the upright shaft 78 above the table 2 and resting on the boss 80 is a cylindrical standard 89. Integrally formed on the upper end of the standard 89 is a horizontal housing 90 comprising a lower section and an upper section secured together by the screws 91 (Fig. 2). Projecting through the housing 90 is a rotatable sleeve 92 having a longitudinal slot 93 in the front end thereof. Engaged on the rear end of the sleeve 92 adjacent the end of the housing 90 is a bevel gear 94 having a flanged projection 95 which is rotatable in a recess provided in the rear end of the housing 90 as illustrated in Figure 3. The bevel gear 94 is in mesh with a stationary curved bevel rack 96 which is supported on an upright 97 mounted on the table 2 (Fig. 1). Fixed on the rear end of the sleeve 92 adjacent the bevel gear 94 is a collar 98, the peripheral edges of which are ground away to form a peripheral middle bead or flange 99, a portion of which is cut away to afford an opening in the bead 99 at the chord 100 (Fig. 6).

Slidably engaged in the sleeve 92 is a rod 101, the front end of which is slit at 102 to permit an arm 103 to be pivoted on a pin 104 carried by the rod 101. Fixed on the front end of the sleeve 92 is a block 105 having a slot therein through which the arm 103 projects. Pivoted to the end of the arm 103 is a yoke or fork 106 formed on an arm 107 which is pivoted on a pin 108 supported in collars 109 on the block 105. Also pivoted on the pin 108 on opposite sides of the arm 107 are a pair of collars 110 which are integrally formed on the sides of a plate 111 positioned above the arm 107. The plate 111 is provided with a set screw 112 which is adapted to rest on the yoke 106. The set screw is held in contact with said yoke by means of a spring 113 positioned in a passage in the arm 107. The lower end of the spring 113 is attached to the lower edge of the arm 107 while the upper end of the spring is secured to the plate 111. Integrally connecting the collars 109 below the pin 108 is the inner end of a dish blank upper gripper plate 114 of substantially triangular shape. Secured to the block 105 is a lower triangular shaped gripper plate 115.

Fixed on the sides of the housing 90 are two gripper arms 116 which extend forwardly and have the ends thereof converging on opposite sides of the lower gripper plate 115. The two gripper arms 116 are provided with notches 117 in the upper surfaces thereof. A finger or lug 118 is fixed on one of the arms 116 to act as a centering means for holding a dish blank 35 in a centered position as illustrated in Figure 4.

A collar 119 is fixed on the rear end of the rod 101 and sets in a packing 120 mounted within a split casting 121 to the back of which the rear end of a curved plate spring 122 is secured. The spring 122 projects forwardly and has the end thereof curled upwardly to form a rounded tip 123, adapted to coact with the bead 99 on the collar 98 (Fig. 7). Secured to the front side of the casting 121 is a yoke or frame 124 carrying a set screw 125 for varying the pressure of the spring 122 with regard to the collar 98. A threaded split hub 126 is integrally formed on the front of the casting 121. Threaded onto the hub 126 is a take up collar 127 also provided to hold the casting sections together. An arm or extension 128 is formed on the rear of the casting 121 and is provided with a passage 129 through which a bolt 130 projects. Projecting through the casting 121 is a shaft or pin 131 on the projecting ends of which are pivoted the rear ends of a pair of upper arms 132. The arms 132 project forwardly and are deflected to permit rollers 133 mounted on said arms to track on the lower arms 116. The front ends of the arms 132 converge and follow the contour of the side edges of the upper gripper plate 114. Springs 134 connect the upper arms 132 to the ends of a stationary cross bar or rod 135 fastened transversely to the front of the standard 89.

Pivotally engaged on the bolt 130 below the arm 128 is one end of a toggle or link 136, the other end of which is pivoted to the long arm 137 of a bell crank comprising said long arm 137 and an integral short arm 138. The bell crank 137—138 is pivoted on a bolt 139 supported on the end of a bracket 140 fixed on one side of the pivoted housing 90. Pivoted to the end of the bell crank arm 138 is one end of a toggle or link 141, the other end of which is pivoted to the end of the gear segment bell crank arm 82. Pivoted on the table 2 at 142 is one end of a curved tapered arm 143 having a tooth 144 integrally formed on the concave edge thereof. The free end of the curved arm 143 is turned up to form a finger 145. The tooth 144 is adapted to coact with notches 146 provided in the head of the bolt 139. Also pivoted to the table 2 is one end of a lever 148 which is held against a stop pin 149 by a coiled spring 150 which connects the lever 148 to the curved arm 143. A lug 151 is formed on the lever 148. A stop pin 153 on the table 2 limits the swing of the curved arm 143 in one direction.

A dish removing mechanism is provided and is operated from the shaft 5. Fixed on said shaft 5 is an eccentric disk 154 provided with a peripheral flange over which an eccentric ring or collar 155 is engaged. A connecting rod 156 connects the eccentric ring 155 with a pin 157 carried by a crank 158 supported on a bracket 159 attached to the framework 1 (Fig. 12). Rigidly secured eccentrically to the eccentric disk 154 is the lower end of a curved arm 160 having a roller 161 mounted on the upper end thereof positioned to track on a curved finger or cam 162 secured to one side of an arm 163 pivoted to the table 2 at 164. Pivotally supported on the arm 163 is a bell crank comprising a long arm 165 and an integral short tapered arm 166. Connected to the bell crank 166 is one end of a coiled spring 167. The coiled spring 167 projects through an opening 168 in the table 2 and has the lower end secured to the sleeve 79. The end of the bell crank arm 165 is twisted and has secured thereon a rubber friction head 169 (Fig. 9), adapted to push a completed sundae dish from the forming gripper plates 114 and 115 into a position to be engaged by a dish stacking mechanism.

Connected to the crank pin 157 is one end of a rod 170 which extends upwardly and has the upper end thereof connected to a beam 171 which is pivoted to the upper end of a bracket 172 secured to the machine table 2 (Figure 11). Secured to the end of the beam 171 is a conical cup or plunger 173 adapted to seat in the completed dishes and push the same into a dish stacking tube or cylinder 174. The plunger 173 is provided with a hole through which a curved dish centering finger 175 slidably projects. A head 176 is formed on the upper end of the finger 175 to hold the centering finger against rotation so that the tip of said finger will always be properly positioned. Integrally formed on the beam 171 is an arm 177 to which one end of a link 178 is pivoted. The other end of the link 178 is pivoted to a bell crank 179, one end of which is pivoted to an arm 180 integrally formed on the bracket 172. The other end of the bell crank 179 has a rod 181 attached thereto.

The rod 181 is connected to a pin 182 supported on a lug 183 formed on a ring 184. The ring 184 is rotatably mounted upon a collar 185 supported within a flanged ring 186 rigidly secured upon the inclined top board 10 of the support 9. The collar 185 is provided with a plurality of teeth to form a ratchet 187 with which a pawl 188 coacts. The pawl 188 is engaged on the pin 182 carried by the lug 183 of the ring 184. A flat ring 189 is secured to the top of the rotatable collar 185 and extends inwardly beyond the inner peripheral surface of the collar 185 to afford a dish retainer to hold dishes stacked within the tube 174. A spring 190 is connected with the pawl 188 to hold the pawl in contact with the ratchet 187.

Secured to the framework 1 is a bracket 191 (Fig. 1), the end of which is bent upwardly at an angle and is provided with an opening 192 through which a rod or stem 193 projects. The lower end of the rod 193 is secured to an arm 194 integrally formed on a sleeve 195 which is slidable on an inclined guide rod 196. The guide rod 196 has one end secured to the bracket 191 and the other end fastened to a floor bracket 197. A bolt 198 is secured to the bracket 191 and has a spring 199 coiled therearound to resiliently hold one end of a forked bar 200 in contact with the bracket 191 and the other or forked end against a ball bearing 200$^a$ which seats against a collar or hub 201 of a base plate 202 for the tube 174. The dish receiving tube 174 is thus held in place with the upper end seated in the rotatable collar 185 to receive the formed sundae dishes. The tube 174 is provided with a longitudinal slot 203. Attached to the arm 194 is one end of a cable 204 which is guided over a pulley 205 and passes upwardly over a pulley 206. A weight 207 is attached to the second end of the cable 204. As illustrated in Figure 21, the rod 193 slidably projects through the hub 201 and has a collar 208 secured thereon to afford a support for a flange plate 209 which is slidable within the tube 174. The plate 209 is centrally apertured at 214 (Fig. 22) to permit the base 210 of a conical dish holder 211 to rest on the tapered end 212 of the rod 193. The plate 209 has a plurality of stays or arms 213 secured thereon to afford a seat for the conical dish holder 211.

The operation is as follows:

The machine is operated by rotating the drive shaft 7 by any suitable drive mechanism connected with said shaft. The shaft 7 acts to transmit the drive to the drive collar 14. The clutch control lever 23 is now actuated to move the gear 17 toward the collar 14 so that the pin 16 will engage in the notch of the collar 14 to cause the drive to be transmitted to said gear 17. The hand wheel 19 is provided for the purpose of operating the clutch mechanism manually if so desired. When the lever 23 is moved into a position to cause operation of the machine, the lever is engaged behind the stop 24 on the bracket 25 (Figure 12) to hold the clutch mechanism in a position to cause the drive from the shaft 7 to be transmitted to the gear 17. The gear 17 being in mesh with the large gear 77 rotates the same and the shaft 5. Rotation of the shaft 5 causes rotation of the bevel gear 37 and the bevel pinion 38. The stub shaft 39 together with the bevel pinion 41 are thus rotated to cause operation of the blank feeding mechanism which continuously delivers prepared sundae dish blanks of paper to the dish forming mechanism.

A stack of prepared dish blanks 35 is placed in the magazine 30 with the lowermost blank 35 contacting the pin 32 and resting upon the platform or table 27 which is provided with a T-opening 29ᵃ. The delivery of a dish blank 35 from the bottom of the stack is accomplished by means of the friction pad 47 which is carried by the rotating reel formed by the disks 44 and the connecting bar 45. The feed reel is rotated by the beveled gear 42 which rotates the shaft 43 supporting the feed reel. As the feed reel is rotated the friction pad 47 thereof is moved into contact with the bottom surface of the lowermost dish blank 35 and frictionally slides said lowermost blank from the magazine through the slot 31 and between the feed rollers 48 and 49. As the lowermost blank is delivered from the magazine the edge of the blank is pulled against the sharp edge of the pin 32 which cuts through the edge of the blank and then engages against the next blank in the magazine as said stack of blanks falls by gravity in the magazine each time a blank is removed.

The blank feed rollers 48 and 49 are rotated by means of the gears 53, 54, 59 and 61 (Fig. 15) so that a dish blank 45 fed between the rotating feed rollers by the friction pad 47 is advanced by said rollers onto the platform 27 beneath the spring arms 62. When the blank has been sufficiently advanced the projection on the cam 76 comes into engagement with the roller 73 thereby causing the rod 70 to move upwardly to actuate the bell crank arm 67. The pusher arms 64 and 65 are thus actuated and swing upwardly and outwardly through the platform slots 63 to engage behind the blank 35 and push the same forwardly against the stops 29 and 118 and in to the field of operation of the dish forming mechanism.

While the blank 35 is being delivered from the magazine into the position illustrated in Figure 4, the crank 88 on the shaft 5 acts through the connecting rod 87 to slide the rack 83 forwardly from the position illustrated in Figure 18. This movement of the rack 83 causes rotation of the gear segment 81 from the full line position of Figure 18 toward the dotted line position of Figure 18. The gear segment 81 being free on the shaft 78 causes rotation thereof thus causing the arm 82 to swing about its pivot from the full line position illustrated in Figure 18 into the dotted line position shown in said Figure 18. Movement of the arm 82 into the dotted line position of Figure 18 causes the link 141 to rotate the bell crank 137—138 about the bolt 139. The tooth 144 of the arm 143 is engaged in the notch 146 of the bolt head 139 thereby preventing swinging of the housing 90 and the forming mechanisms. As the bell crank arm 137 swings into the dotted line position of Figure 18, the link 136 acts to pull rearwardly on the casting 121 thereby first acting to pull the rod 101 through the sleeve 92 and at the same time causing the tip 123 of the curved spring 122 to slide rearwardly over the chord 100 of the flanged collar 98 which is positioned with the chord 100 uppermost as illustrated in Figure 3 when the forming mechanisms are in normal position as shown in Figure 2. Movement of the rod 101 rearwardly in the sleeve 92 actuates the arm 103 and the yoke 106 thereby causing the upper gripper 114 to move upwardly away from the lower gripper 115. The set screw 112 acts to determine the gripping stress of the grippers 114 and 115. The tension of the spring 113 is just sufficient to open the grippers as permitted by the fold in the formed dish to obviate injury to the tip of the dish.

With the opening of the grippers 114 and 115 the upper blank clamping arms 132 are retracted into the position shown in Figure 4 with the rollers 133 riding out of the notches 117 and up on the lower clamping arms 116. When the arm 103 comes into contact with the sleeve 92 the sleeve is also moved rearwardly in the housing 90 thereby retracting the grippers until the block 105 contacts the end of the housing 90.

As the bell crank 137—138 is pivoted about the bolt 139 the long bell crank arm 137 moves into contact with the finger 145 of the curved arm 143 and acts to swing the arm 143 into the dotted line position of Figure 18 thereby moving the tooth 144 out of engagement with the notch 146 of the head of the bolt 139. The continued swing of the arm 82 now acts to pivot the bell crank 137—138 toward the full line position of Figure 19 at the same time acting on the bolt 139 and the bracket 140 to swing the housing 90 about its pivot from the position shown in Fig. 2 towards that illustrated in Fig. 4.

As the housing 90 starts to swing, the bevel gear 94 coacting with the stationary bevel rack 96 rotates and thereby causes the sleeve 92 and the grippers 114 and 115 to rotate one-half of a revolution with the grippers open and retracted. The open grippers are thus permitted to clear the edge of the blank 35 and move into the position illustrated in Figure 4 as the blank is pushed against the centering finger 118 on one of the arms 116 and against the stop 29 by the pushers 64 and 65. The blank is thus moved into a properly centered position.

When the bell crank 137—138 reaches the position illustrated in Figure 19 the end of the lever 148 registers with one of the notches 146 in the head of the bolt 139 and the spring 150 draws the lever toward the stop pin 149 with the end of the lever 148 engaging in said notch.

The mechanisms are now positioned as illustrated in Figure 4. At this stage in the operation the crank 88 on the shaft 5 has completed a half revolution and consequently starts to pull the rack 83 back. This movement of the rack 83 tends to act on the gear segment 81 to rotate the same in a reverse direction thereby causing the arm 82 to move from the full line position of Figure 19 into the dotted line position. Since the housing 90 is locked against swinging by the lever 148 engaging in the bolt head notch 146, the link 141 acts to pivot the bell crank about the bolt 139 toward the dotted line position of Figure 19. The link 136 is thus pulled back toward normal position thereby acting on the casting 121 to move the same forwardly from the dotted line position of Figure 11 toward the full line position. This forward movement of the casting 121 pushes the upper arms 132 forwardly over the blank and at the same time permits the spring 122 which is engaged behind the bead 99 of the collar 98 to push said collar and the sleeve 92 forwardly, thereby advancing the open grippers 114 and 115 over the centered blank 35. When the collar 98 strikes against the bevel gear 94 the tip 123 of the spring 122 is pushed over the bead 99 and the continued forward movement of the casting 121 causes the rod 101 to slide forwardly in the sleeve 92 thereby closing the upper gripper 114 to clamp the blank between the grippers 114 and 115. As this operation takes place the rollers 133 of the upper arms 132 reach the notches 117 in the lower arms 116 thereby permitting the advanced upper arms 132 to be pulled down by the springs 134 against the upper surface of the blank 35 directly over the lower arms 116.

At this stage in the operation the bell crank arm 137 strikes the lug 151 on the lever 148 thus forcing the end of the lever 148 out of the notch 146 (Figure 19) thereby releasing the housing 90. The continued movement of the arm 82 back towards normal position now causes the link 136 to move the bell crank 137—138 from the dotted line position in Figure 19 back toward the full line position of Figure 18 thereby acting on the bracket arm 140 to swing the housing 90 and the forming mechanisms back from the position illustrated in Figure 4 toward the position shown in Figure 2. With the return of the forming mechanisms, the bevel gear coacting with the stationary rack 96 acts to rotate the sleeve 92 back through a half revolution. That portion of the blank 35 which is gripped between the grippers 114 and 115 is thus turned with the grippers, thereby causing the blank to be drawn inwardly between the guide arms 116 and 132 thus forming a conical sundae dish.

When the dish forming mechanisms reach their normal positions shown in Figure 2, the tooth 144 on the arm 143 is pulled into the notch 146 in the head of the bolt 139 by the spring 150 (Figure 18). The formed sundae dish is now positioned ready to be discharged.

The sundae dish forming cycle of operations now begins to repeat itself with the bell crank 137—138 first acting to withdraw the upper blank guide arms 132 and open the grippers before the grippers are retracted from the formed sundae dish. As the grippers are opened and retracted from the formed sundae dish the eccentric disk 154 on the shaft 5 actuates the arm 160 so that the roller 161 rolls on the concave edge of the curved finger or cam 162, thereby causing the arm 163 to swing upwardly from the full line position of Figure 9 into the dotted line position. With the upward swing of the arm 163 the spring 167 acts to pull downwardly on the bell crank arm 166 thereby pivoting the bell crank and moving the friction head 169 against the outer surface of the folded portion of the formed sundae dish. With the continued upward swing of the arm 163, the spring 167 is tensioned and the pusher head 169 moves forwardly to push the sundae dish off of the retreating open grippers.

The sundae dish is thus moved toward discharge position while the connecting rod 156 operated by the eccentric ring 155 actuates the crank 158 so that the rod 170 is pulled downwardly thereby swinging the beam 171 downwardly to lower the conical plunger 173 into the sundae dish. As this is done the projecting centering finger 175 projects down into the apex of the dish to center the dish with respect to the entrance ring 189 of the dish receiving and stacking tube 174. With the continued downward movement of the plunger 173 the centering finger 175 slides upwardly through the opening in the conical plunger permitting the plunger to seat in the sundae dish to hold the same shaped, and push the dish through the ring 189 and through the collar 185 into the conical sundae dish holder 211 (Fig. 21). As the dish passes through the ring 189 it is slightly compressed and as soon as it passes the ring 189 expands to seat against the inner face of said ring which acts to hold the dish from springing upwardly out of the tube due to the resiliency of the folded portion of the dish. Each time a dish is delivered into the tube 174 and seats in the holder 211, said holder is forced inwardly a predetermined distance thereby sliding the sleeve 195 downwardly on the rod 196 and at the same time causing the cord or cable 204 to pull the weight 207 upwardly a predetermined distance. As the conical plunger 173 pushes a dish through the ring 189 the dish is pressed against the holder 211 or against another dish in said holder to complete the creasing of the dish. After the tube 174 is about half full of formed dishes the weight 207 reaches an elevation wherein it comes in contact with a suspended weight 207ª and picks up said weight to increase the weight of the counterbalance to compensate for the increasing weight of the stack of dishes in the tube.

Each time the beam 171 is lowered to push a dish into the receiving tube the link 178 is moved from the full line position of Figure 11 into the dotted line position, thereby acting to swing the arm 179 about its pivot actuating the rod 181 to partially rotate the ring 184 in the collar 185 in a clockwise direction looking at Figure 20. The pawl 188 is thus retracted until the end thereof reaches the next notch in the ratchet wheel 187. The spring 190 acts to pull the end of the pawl into the notch so that when the beam 171 swings upwardly the rod 181 pulls the ring 184 in an anti-clockwise direction looking at Figure 20, thereby causing the pawl 188 to rotate the collar 185 and the tube 174 one sixth of a revolution each time a dish is deposited in the tube.

It will thus be noted that the formed sundae dishes are automatically pushed into the stacking mechanism to seat one within the other supported by the holder 211. Each time a dish is delivered into the stacking mechanism it is creased at the folded portions by the pressure of the plunger 173 and the holder is lowered a predetermined amount and partially rotated with the tube 174. The sundae dishes are thus stacked with the folded portions thereof staggered with respect to one another. A stack of dishes is thus produced which is straight and will not tend to bend or curve to one side as is the case when folded dishes are stacked with the folded portions thereof disposed one above the other.

When the stack of sundae dishes in the tube 174 has reached a desired height, the machine is stopped and the tube base piece 202 is pushed or pulled downwardly against the action of the spring 199 thereby releasing the lower end of the tube 174 and permitting the tube to be pulled out of the collar 185 and removed from the machine. With the tube removed from the holders, the stack of dishes therein may be removed through the upper end of the tube by inserting a lifter or a finger through the tube slot 203 beneath the holder 211 or at any desired point in the stack of dishes depending on how many dishes are to be removed.

It will be noted that the improved sundae dish forming machine of this invention is adapted to automatically feed dish blanks into proper centered relation on the machine platform with respect to a forming mechanism which acts automatically to fold the blanks to form conical sundae dishes, which, when formed, are adapted to be engaged by a transfer or discharge mechanism, which acts automatically to transfer or push the formed dishes from the forming mechanism to the automatic stacking attachment which acts to center and push the dishes into a rotatable and slidable holder within a slotted tube and below a retaining ring which serves to hold the stacked dishes properly seated one within the other with the folded portions thereof staggered.

The operation of only one unit of the machine has been described, but it will of course be understood that any desired number of units may be used or operated independently of one another from the common driving mechanisms.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a dish forming machine, the combination with a blank feeding mechanism, of a pivotally mounted forming mechanism, means for swinging the forming mechanism toward the feeding mechanism to grip a delivered blank and form the blank into a dish during the return movement of said forming mechanism.

2. In a dish forming machine the combination with a blank feeding mechanism adapted to deliver a blank into a centered position, of a pivotally mounted support, forming mechanisms carried thereby, means for swinging the support toward the delivered blank and back again, and forming mechanisms carried by said support adapted to grip the blank and then form the same into a dish during the return of the support.

3. In a dish forming machine the combination with a blank feeding mechanism adapted to deliver a blank into a centered position, of a pivoted support, grippers thereon, means for swinging the support toward the centered blank and rotating the grippers, devices actuated by said means for advancing and closing the grippers to engage the blank, said means further adapted to return the support and rotate the closed grippers to cause the same to form the blank into a dish.

4. The combination with a mechanism for delivering a blank into a centered position, of a pivoted support, means for swinging the support toward the blank, grippers carried by the support, guide arms on said support adapted to engage opposite sides of the blank, mechanisms for closing the grippers to engage the blank, and means for rotating the grippers to pull the blank between said guide arms to form the blank into a dish with the return movement of said pivoted support.

5. The combination with a mechanism for feeding a blank into a centered position, of a pivoted support, guide arms on said support, grippers carried by the support, means for reciprocating the support, mechanisms operated by said means to close the grippers to engage the blank, and means for rotating the grippers when closed to cause the same to draw the blank through said guide arms to form a conical dish.

6. In a sundae dish forming machine the combination with means for automatically feeding a dish blank into a centered position, of a pivoted support, lower blank guide arms mounted on said support and adapted to be disposed below the blank, movable guide arms for coaction with said lower guide arms, a slidable sleeve in said support, grippers supported thereon, means for advancing the movable guide arms over the blank and also advancing and closing the grippers to grip the blank between the grippers, a drive mechanism connected to swing the support about its pivot, and means connected to rotate the sleeve and said grippers when the support is actuated to cause the grippers to rotate and draw the blank between the lower arms and said movable arms and fold said blank to form a sundae dish.

7. In a sundae dish forming machine the combination with a blank feed means, of a dish forming mechanism, means for swinging said mechanism into alignment with a blank, guide members carried by the forming mechanism adapted to engage above and below the blank grippers forming a part of the forming mechanism, means for advancing the grippers over the blank and then closing the grippers to clamp the blank, and gear means connected with the grippers to rotate the same to draw the blank through the guide members and fold the blank to form a sundae dish when the swinging means returns the forming mechanism to normal position.

8. In a sundae dish forming machine the combination with a pivoted support, of a sleeve slidable therein, grippers supported on the sleeve, a rod slidable in the sleeve connected with one of the grippers to actuate the same, means for first advancing the sleeve and grippers and actuating the rod to cause the grippers to grip the blank, and mechanisms for rotating the sleeve and grippers to cause the blank to be formed into a sundae dish.

9. In a sundae dish forming machine the combination with a pivoted support, of a sleeve slidable therein, grippers supported on the sleeve, a rod slidable in said sleeve and connected to one of said grippers to actuate the same with respect to the other gripper, dish blank guide means on the support, a gear on said sleeve, a stationary rack in mesh with said gear, and means for swinging said support about its pivot to cause rotation of said gear, sleeve and grippers whereby a blank engaged by the grippers is pulled between said guide means and folded to form a sundae dish.

10. In a sundae dish forming machine, a support, blank grippers, mechanisms connected with the grippers and mounted on the support, driving means for pivoting the support and actuating said mechanisms to cause the grippers to engage a blank, and rack and gear means connected with said mechanisms to rotate the same and said grippers when the support is pivoted.

11. In a dish forming machine a forming mechanism comprising a pivoted support, a gear rotatably supported on the support, a sleeve slidable in said support and gear and adapted to rotate in the support, a head on said sleeve, a gripper fixed thereon, a second gripper movably supported on the head, a rod slidable in said sleeve, means connecting the rod with said movable gripper, a casting connected with the rod, resilient means thereon adapted to slide the sleeve with respect to said support when the casting is moved, a stationary rack in mesh with said gear, and a driving means connected with said casting to cause pivoting of the support and operation of the sleeve, rod and movable gripper.

12. In a dish forming machine a forming mechanism comprising a pivoted support, a gear rotatably supported in one end thereof, a sleeve slidable in said support and gear and keyed to the sleeve to rotate the same, a head secured on one end of the sleeve, a lower gripper fixed on said head, an upper gripper movably supported on the head for coaction with the lower gripper, a rod slidable in said sleeve, means connecting the rod with the upper gripper, a peripherally flanged collar on the other end of said sleeve, a casting secured to said rod to the outside of said collar, a spring on said casting for coaction with the flange on said collar, a stationary rack in mesh with said gear, a bracket on said support, a bell crank on said bracket connected with said casting, and driving means also connected with the bell crank to cause operation of the dish forming mechanism.

13. In a dish forming machine a dish forming mechanism comprising a pivoted support, a gear rotatably supported in one end thereof, a sleeve slidable in said support and gear and keyed to the sleeve to rotate the same, a head secured on one end of the sleeve, a lower gripper fixed on said head, an upper gripper movably supported on the head for coaction with the lower gripper, a rod slidable in said sleeve, means connecting the rod with the upper gripper, a peripherally flanged collar on the other end of said sleeve having a portion thereof cut away leaving a chord, a casting secured to said rod to the outside of said collar, a spring on said casting for coaction with with said flanged collar, a stationary rack in mesh with said gear, a bracket on said support, a bell crank on said support, a link connecting the bell crank with said casting, rack and gear means connected with the bell crank, driving means for operating the rack and gear means to cause operation of the dish forming mechanism, and control levers operable by the bell crank for controlling the time of operation of the movable gripper.

14. In a dish forming machine a pivoted support, dish forming mechanisms supported thereon, a bracket formed on the support, a bell crank pivoted on the bracket, a link connecting the dish forming mechanisms with the bell crank, a gear segment, means for operating the same, an arm integrally formed on the gear segment, and a toggle pivotally connected to said arm and to said bell crank.

15. In a dish forming machine a pivoted support, dish forming mechanisms supported thereon, a bracket on the support, a bell crank pivoted on the bracket, a link connecting the dish forming mechanisms with the bell crank, a gear segment, a reciprocating rack in mesh with the gear segment to operate the same, an arm integrally formed on the gear segment, a toggle connecting said arm with the bell crank, and control levers operable by the bell crank for governing the time of operation of the forming mechanisms.

16. In a dish forming machine a pivoted support, dish forming mechanisms thereon, a bracket on the support, a notched bolt on the bracket, a bell crank pivoted on the bolt, a link connecting the dish forming mechanisms with the bell crank, a pivoted gear segment, a reciprocating rack in mesh with the gear segment to operate the same, an arm integral with the gear segment, a toggle connecting said arm with the bell crank, a toothed control lever for coaction with the notched bolt and operable by the bell crank to release the bolt to permit swinging of the pivoted support, and a second control lever also adapted to coact with the notch bolt to hold the pivoted support against a return movement until released by said bell crank.

17. In a dish forming machine a pivoted support, dish forming mechanisms thereon, a bracket on the support, a notched bolt on the bracket, a bell crank pivoted on the bolt, a link pivoted on the bell crank and connected to the dish forming mechanisms, a pivoted gear segment, a rack in mesh therewith, means for reciprocating the rack, an arm integrally formed on the gear segment, a member pivotally connected to said arm and to the bell crank, a pivoted lever, a tooth on said lever for coaction with the notched bolt to hold the support locked against a swinging movement, a finger formed on the lever adapted to be contacted by the bell crank to release the tooth from engagement with the notched bolt to permit swinging of the support, a second pivoted control lever, a spring connecting the same with said first mentioned lever, a finger on said second lever adapted to engage the notched bolt to hold the support locked against a return movement, and a projection on said second lever adapted to be contacted by the bell crank to cause release of the finger on said second lever from said notched bolt to permit return of the support.

18. In a dish forming machine a pivoted support, dish forming mechanisms thereon, gear and rack means for swinging the support into a position to engage a blank and back again, a pair of spring connected control levers for controlling the time at which the support is to swing, and a member actuated by the gear and rack means adapted to release the control levers at predetermined times to permit swinging of said support.

19. In a dish forming machine a pivoted support, dish forming mechanisms thereon, gear and rack means for swinging the support into a position to engage a blank and then carry the blank into a discharge position, means connected with the forming mechanisms and operable from the gear and rack means for forming a dish from the blank during the return of the support to normal position, and spring connected levers controlling the time of swing of the pivoted support.

20. In a dish forming machine a pivoted support, dish forming mechanisms thereon, driving means for swinging the support into a position to permit the forming mechanisms to engage a blank and carry the same into a dish discharge position, means operable by the swinging of said support for causing the forming mechanisms to form a dish from the blank, pivoted levers for locking the support in its extreme positions of movement, and means operated by the driving means for releasing the pivoted levers at predetermined times to permit swinging of the support.

21. In a dish forming machine a support, dish forming mechanisms thereon, driving means for swinging the support into a blank gripping position, mechanisms for actuating the forming mechanisms at a predetermined time to grip a blank, means actuated by the swinging of said support to cause the gripped blank to be formed into a dish as the support returns to normal position, and means operated from the driving means for pushing the formed dish from the forming mechanism.

22. In a dish forming machine a pivoted support, dish forming mechanisms thereon, guide members on said support, means for swinging the support into a position to permit the forming mechanisms to engage a blank, means operable by the swinging of said support to cause the forming mechanisms to rotate to pull the blank through the guide members and form a dish, a pusher, and eccentrically operated means for operating the pusher to cause the same to discharge the dish from the forming mechanisms.

23. In a dish forming machine a pivoted support, dish forming mechanisms thereon, blank guide members on said support, driving means for swinging the support into a position to permit the forming mechanisms to grip a blank, means operable by the swinging of said support to cause rotation of the forming mechanisms to draw the blank between the guide members and form a dish, a pivoted arm, a spring controlled bell crank pivoted thereon, a pusher head on said bell crank, and eccentrically operated means operated by said driving means for actuating the pivoted arm and causing the pusher head to push the formed dish from the forming mechanisms.

24. In a dish forming machine, a blank feeding means, a dish forming mechanism, driving means for operating the feeding means and said forming mechanism to cause a blank advanced by the feeding means to be gripped by the forming mechanism and formed into a dish, and a bell crank pusher operable by said driving means for pushing the completed dish from the forming mechanism.

25. In a dish forming machine, a blank feeding means, a dish forming mechanism, driving means for operating the feeding means and said forming mechanism to cause a blank advanced by the feeding means to be gripped by the forming mechanism and formed into a dish, a pivoted arm, a bell crank pivoted thereon, a spring connected to one end of said bell crank, a pusher head on the other end of the bell crank, an eccentric driven by said driving means, and a member secured to the eccentric and actuated thereby to swing said pivoted arm and cause the pusher head to push the formed dish from the forming mechanism.

26. In a dish forming machine, a blank feeding means, a dish forming mechanism, driving means for operating the feeding means and said forming mechanism to cause a blank advanced by the feeding means to be engaged by the forming mechanism and formed into a dish, a pivoted arm, a cam formed thereon, a bell crank pivoted on said arm, a spring connected to one end of said bell crank, a pusher head on the other end of the bell crank, an eccentric device driven by the driving means, an arm secured to said eccentric device, and a roller on said last mentioned arm adapted to coact with said cam to cause the pusher head on the bell crank to push the dish from the forming mechanism.

27. In a dish forming machine, a blank feeding means, a dish forming mechanism, driving means for operating the feeding means and said forming mechanism to cause a blank advanced by the feeding means to be engaged by the forming mechanism and formed into a dish, a pusher device, an eccentric mechanism operated by said driving means to cause the formed dish to be pushed from the forming mechanism by said pusher device, a dish receiving tube, and a discharge mechanism operated by the eccentric mechanism to engage the pushed-off dish and deliver the same into said receiving tube.

28. In a receptacle forming machine, a blank feeding means, a receptacle forming mechanism, driving means for operating the feeding means and said forming mechanism to cause a blank advanced by the feeding means to be engaged by the forming mechanism and formed into a receptacle, an eccentrically operated pusher device driven by said driving means to push the formed receptacle from the forming mechanism, a receptacle receiving tube, a plunger mechanism, a centering device therein, and eccentrically operated means driven by the driving means to operate the plunger to first cause the centering device to center the pushed-off receptacle and then cause said centered receptacle to be pushed into said receiving tube.

29. In a dish forming machine, the combination with a dish forming mechanism, a holder for receiving a completed dish, a bell crank pusher operable from the machine for pushing the completed dish off of the forming mechanism, a plunger, a centering device projecting therefrom, and means operable from the machine for actuating the plunger to first cause the centering device to engage and center the dish and then cause said plunger to seat in the dish and push the same into said holder.

30. In a dish forming machine, the combination with a dish forming mechanism, means for feeding blanks into position to be engaged thereby and formed into dishes, a support, a rotatable member thereon, a ratchet-wheel formed on said rotatable member, a tube projecting into said rotatable member, a base for said tube, a resilient support for said base, a dish holder in said tube, a plunger, a pawl mechanism coacting with the ratchet-wheel, and mechanisms actuated from the machine to cause the plunger to push the formed dishes into the holder and actuate the pawl mechanism to rotate the ratchet-wheel, tube and holder each time a dish is delivered thereto.

31. In a dish forming machine, a dish forming mechanism, means for pushing completed dishes therefrom, a dish receiving tube, a pawl and ratchet mechanism connected therewith, a plunger device, and mechanisms operable from the machine for causing the plunger device to push the completed dishes into the tube and actuating the pawl and ratchet mechanism to partially rotate the tube each time a dish is received.

32. In a dish forming machine, the combination with a dish forming mechanism, means for pushing a completed dish therefrom, a support, a collar rotatable thereon, a ratchet-wheel formed on said collar, a tube projecting into said collar, a base for the tube, a resilient support for the base, a holder slidably supported in said tube, a slidable support for the holder, a counterweight connected with said slidable support, a pawl coacting with the ratchet-wheel, a pivoted arm, a plunger thereon, a dish centering device in the plunger, means operated from the machine for actuating said arm to cause the centering device to first enter the dish to center the same and then cause the plunger to push the centered dish into the holder in said tube and lower the holder a predetermined amount, and toggle mechanisms connected with said pawl and operated by said arm to cause the pawl to rotate the ratchet-wheel, tube and holder a predetermined amount each time a disk is delivered to the holder.

33. In a dish forming machine, the combination with a dish forming mechanism operated from the machine to form a dish from a blank, means for discharging the dish from the forming mechanism, a rotatable dish receiving tube, a pawl and ratchet mechanism connected with the tube, a plunger, and a mechanism operable from the machine adapted to cause the plunger to deliver the dish into the tube and operate the pawl and ratchet mechanism to rotate the tube a predetermined amount each time a dish is delivered thereto.

34. In a dish forming machine, the combination with a dish forming mechanism adapted to form a dish from a blank, of means for removing the dish from the forming mechanism, a removable and rotatable dish receiving tube, means for resiliently holding the tube in receiving position, and mechanisms operable from the machine for rotating the tube a predetermined amount and delivering the removed dish into the receiving tube.

35. In a dish forming machine, the combination with a dish forming mechanism adapted to form a dish from a blank, of means for removing the dish from the forming mechanism, a rotatable dish receiving tube, means for resiliently holding the same in receiving position, a rod slidably projecting into the tube, a guide for said rod, a holder in said tube rotatably engaged on the inner end of said rod, pawl and ratchet mechanisms connected with the tube, a plunger, and means operating the pawl and ratchet mechanisms to rotate the tube and said holder a predetermined amount and also causing the plunger to push the removed dish into the holder within the tube.

36. In a dish forming machine, the combination with dish forming means, mechanism for removing a formed dish from the forming means, a receiving tube, mechanisms operated from the machine for rotating the tube and delivering the removed dish into the tube, a holder in said tube for receiving the dish, a rod slidably projecting into the tube to afford a pivot support for the holder, a stationary guide, a collar slidable thereon and formed to support the rod, and a counter-weight connected with said collar to hold the rod and holder in a dish receiving position in said tube.

37. In a dish forming machine, the combination with dish forming means, a pusher mechanism for removing a formed dish from the forming means, a dish receiving tube, a rotatable collar into which said tube projects, a ratchet wheel formed on said collar, a ring engaged on said collar, a spring controlled pawl supported on said ring in position to coact with the ratchet wheel, a bracket, an arm pivoted thereon, an apertured cup supported on said arm, a centering member in said cup projecting through the aperture therein, means operated from the machine for swinging said arm to cause the centering member to first enter the removed dish to center the same to permit the cup to enter the dish and push the same into said tube, and a toggle mechanism operated by the swinging of said arm to operate the pawl to rotate the ratchet-wheel and said tube a predetermined amount.

38. In a dish forming machine, the combination with a forming mechanism for forming a dish from a blank, of a spring controlled bell crank pusher, an eccentric means operated by the machine for actuating the bell crank pusher to cause the same to push the formed dish from the forming mechanism.

39. In a dish forming machine, the combination with a forming mechanism for forming a dish from a blank, an eccentric operated by the machine, a pusher mechanism operated by the eccentric to push a formed dish from the forming mechanism, a dish receiver, and means operated by said eccentric for engaging and centering the dish and then delivering said dish into the receiver.

40. In a dish forming machine, the combination with a blank centering mechanism, of a support, guides supported on the support adapted to project below and above said centered blank, and grippers rotatable between said guides to fold the blank into a conical sundae dish.

41. In a dish forming machine, a dish forming mechanism comprising guides adapted to engage below and above a centered blank, grippers, means for operating the grippers to first cause the same to clamp a portion of the blank therebetween and then rotate to draw the blank through the guides and fold the blank into a conical dish, and means for first opening the grippers and then retracting the same from the formed dish.

42. In a dish forming machine, a dish forming mechanism comprising guides adapted to engage below and above a centered blank, grippers, means for operating the grippers to first cause the same to clamp a portion of the blank therebetween and then rotate to draw the blank between the guides and fold the blank into a conical dish, means for first releasing the grippers and then retracting the same from the formed dish, and mechanisms connected with the grippers for resiliently holding the same in a substantially closed position until they have been sufficiently retracted from the formed dish to prevent tearing of the apex of the conical dish.

43. In a dish forming machine, the combination with guides adapted to engage against opposite sides of a centered blank, of grippers, mechanisms for sucessively closing the grippers to engage the blank and then rotating the closed grippers to draw the blank between the guides and fold the blank into a conical sundae dish, a mechanism for releasing the grippers, means for retracting the released grippers from the formed dish, a plate associated with said releasing mechanism, a spring connecting said plate with said releasing mechanism, and a set screw for adjusting the tension of said spring, said spring and plate acting to hold the grippers in a substantially closed position until they have been sufficiently retracted from the formed dish to obviate tearing of the apex of the dish by the ends of said grippers.

44. In a conical dish forming machine, grippers for engaging and folding a blank to form a conical dish, means for releasing and withdrawing the grippers from the formed dish, and means for resiliently holding the grippers in a substantially closed position during the retraction thereof from the dish to obviate tearing of the apex of the conical dish.

45. In a dish forming machine, the combination with a blank feeding mechanism, of a pivotally mounted forming mechanism, and means for moving the forming mechanism relative to the feeding mechanism to grip a delivered blank and form the blank into a dish.

46. In a dish forming machine, the combination with a blank feeding mechanism adapted to deliver a blank into a centered position, of a movably mounted support, forming mechanisms thereon, means for moving the support relative to the delivered blank, and rotatable forming mechanisms carried by said support adapted to grip the blank and form the same into a dish.

47. The combination with a mechanism for delivering a blank into a centered position, of movably mounted grippers, mechanism for moving the grippers into a predetermined position and then closing the same to engage the blank, guide members positioned adjacent opposite sides of the blank, and means for rotating the grippers to hold the blank between said guide members to form the blank into a dish.

48. The combination with a mechanism for feeding a blank into a centered position, of a plurality of pivotally supported guide members one of which is shiftable with respect to the other, and means for engaging the centered blank and then drawing said blank through the guide members when the same are in register to form a conical dish.

49. In a dish forming machine, the combination with movably mounted guides, of gripper means positioned between the guides, and means for rotating the gripper means with respect to said guides to draw a blank through said guides to form a conical dish.

50. In a dish forming machine, the combination with movably mounted guides, of movably mounted grippers positioned between the guides, mechanisms for moving the guides and grippers into a position to be positioned above and below a blank, a mechanism for closing the grippers to cause the same to engage the blank, and means for rotating the grippers to draw the blank between said guides to form a conical dish.

51. In a dish forming machine, a pivoted support, dish forming mechanisms thereon, means for swinging the support into and out of a blank engaging position, control means for governing the time at which the support is to swing, and a member actuated by the swinging means adapted to release the control means at predetermined times to permit swinging of said support.

52. In a dish forming machine, a pivoted support, dish forming mechanisms mounted thereon, and gear and rack means for swinging the support into a position to engage a blank and then carry the blank into a discharged position.

53. In a dish forming machine, a support, rotatable dish forming mechanisms thereon, driving means for swinging the support into a blank engaging position, means for rotating the forming mechanisms at a predetermined time to cause the blank to be automatically formed into a conical dish, and means operated from the driving means for removing the formed dish from the forming mechanisms.

54. In a dish forming machine, a support, rotatable dish forming mechanisms thereon, driving means for swinging the support into a blank engaging position, means for rotating the forming mechanisms at a predetermined time to cause the blank to be automatically formed into a conical dish, means operated from the driving means for removing the formed dish from the forming mechanisms, and a mechanism for operating the removing means at a predetermined time.

55. In a dish forming machine, the combination with a blank feeding means, of a pivotally mounted shiftable dish forming mechanism, driving means for operating the feeding means and said forming mechanism to cause a blank advanced by the feeding means to be gripped by the forming mechanism and then formed into a dish, and a mechanism operated by said driving means for removing the completed dish from the forming mechanism.

56. In a dish forming machine, the combination with a shiftable and rotatable forming mechanism for forming a dish from a blank, of a pusher, and eccentrically operated means operated by the machine for causing the pusher to engage in the formed dish and remove the dish from the forming mechanism.

57. In a dish forming machine, the combination with guides adapted to be positioned adjacent opposite faces of a blank, and means positioned between the guides adapted to be moved with respect thereto to cause the blank to be drawn between said guides to form a conical dish.

In testimony whereof I have hereunto subscribed my name in the presence of two subscribing witnesses.

RUDOLPH HOLMAN.

Witnesses:
   FRED E. PAESLER,
   OSCAR HARTMANN.